United States Patent [19]
de Haan et al.

[11] Patent Number: 4,933,766
[45] Date of Patent: Jun. 12, 1990

[54] INTERPOLATION FILTER AND RECEIVER PROVIDED WITH SUCH AN INTERPOLATION FILTER

[75] Inventors: Gerard de Haan, Eindhoven, Netherlands; Philippe A. M. Van Overmeire, Brugge, Belgium

[73] Assignee: U.S. Philips Corporation, New York, N.Y.

[21] Appl. No.: 347,310

[22] Filed: May 3, 1989

[30] Foreign Application Priority Data

Jun. 2, 1988 [NL] Netherlands .................. 8801414

[51] Int. Cl.$^5$ .............................................. H04N 5/21
[52] U.S. Cl. ................................. 358/166; 358/138
[58] Field of Search ................... 358/138, 166, 167

[56] References Cited

U.S. PATENT DOCUMENTS 4,334,244  6/1982  Chan .................................... 358/166
4,682,230  7/1987  Perlman ............................... 358/167
4,723,163  2/1988  Skinner ................................ 358/140

Primary Examiner—Howard W. Britton
Attorney, Agent, or Firm—Michael E. Marion

[57] ABSTRACT

A simple and reliable interpolation filter can be provided by a median filter 9 to which signals of the pixels $x_1$, $x_2$ and $x_3$ are applied and which can supply incorrect output values at high spatial frequencies perpendicular to a connection line of pixels $x_3$ and $x_4$ located diametrically with respect to a pixel (.) to be interpolated, in conjunction with an averaging circuit 25 to which signals of the pixels $x_3$ and $x_4$ are applied and which will not be disturbed at the said frequencies, but will cause disturbances at high spatial frequencies in the direction of this connection line $x_3$-$x_4$, at which last-mentioned frequencies the median filter 9 will function correctly again.

4 Claims, 1 Drawing Sheet

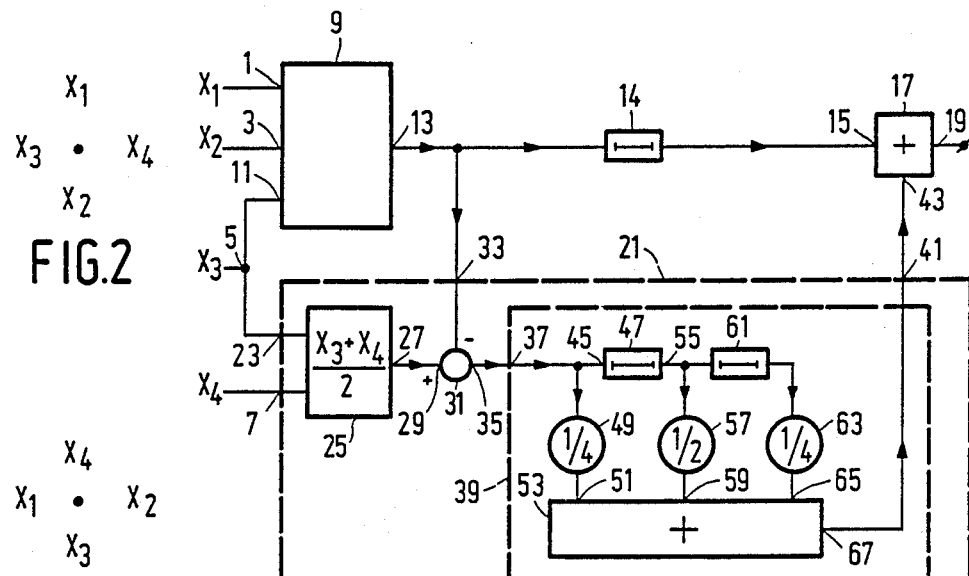

INTERPOLATION FILTER AND RECEIVER PROVIDED WITH SUCH AN INTERPOLATION FILTER

BACKGROUND OF THE INVENTION

The invention relates to an interpolation filter for a picture signal sampled in accordance with a sampling pattern which is shifted from line to line, and to a receiver provided with such a filter.

An interpolation filter of this type is known from European Patent Application EP-A No. 0,146,713. In a receiving section of the MUSE system described in that application in the case of moving pictures each received sampled field is completed by means of spatial interpolation, using a first interpolation filter which is similar to a first anti-alias filter in a transmitting section of the system. In the case of still pictures four received fields are combined to a combined field which is subsequently completed by means of spatial interpolation, using a second interpolation filter which is similar to a second anti-alias filter in the transmitting section of the system.

Such interpolation filters, which are similar to anti-alias filters, are generally rather complex. The object of the invention is to provide a simple interpolation filter.

SUMMARY OF THE INVENTION

According to the invention an interpolation filter of the type described in the opening paragraph is therefore characterized in that the interpolation filter is provided with a median filter having three inputs for receiving signals of three picture elements (pixels) located around a pixel to be interpolated, a correction circuit comprising an averaging circuit having two inputs for receiving signals of two pixels located diametrically with respect to the pixel to be interpolated, one of the two inputs being coupled to one out of said three inputs of the median filter, said averaging circuit having an output which is coupled to an output of the correction circuit, and a combination circuit having a first and a second input which are coupled to an output of the median filter and to the output of the correction circuit, respectively.

The invention is based on the following recognition. At high spatial frequencies perpendicular to a connection line of the pixels which are located diametrically with respect to the pixel to be interpolated and whose signals are applied to the averaging circuit, the median filter may supply incorrect output values, whereas the averaging circuit will not be disturbed at these frequencies, but will cause disturbances at high spatial frequencies in the direction of this connection line, and the median filter will function correctly again at these last-mentioned frequencies so that a simple and reliable interpolation filter can be provided by the median filter in conjunction with the averaging circuit. In this respect it may be noted that the anti-alias filtering used in the transmitting section precludes the simultaneous occurrence of high horizontal and high vertical frequencies in the received signal.

An embodiment of the interpolation filter according to the invention is characterized in that the correction circuit is further provided with a subtractor circuit having a first input which is coupled to the output of the averaging circuit and a second input which is coupled to the output of the median filter, and a low-pass filter operating in a direction of a connection line of the pixels located diametrically with respect to the pixel to be interpolated, said low-pass filter having an input which is coupled to an output of the subtractor circuit and an output which is coupled to the output of the correction circuit. In this embodiment a correction signal is constituted by a difference signal of an output signal of the averaging circuit and an output signal of the median filter. To cause the correction circuit to be exclusively active for those frequencies at which the median filter does not function correctly, but at which the averaging circuit does function correctly, the difference signal is passed through the low-pass filter operating in the direction of the connection line before it is added to the output signal of the median filter.

BRIEF DESCRIPTION OF THE DRAWINGS

The invention will now be described in greater detail, by way of non-limitative example, with reference to the accompanying drawing in which FIG. 1 shows an interpolation filter according to the invention, FIG. 2 shows a first configuration of pixels and FIG. 3 shows a second configuration of pixels.

DETAILED DESCRIPTION OF THE INVENTION

FIG. 1 shows an interpolation filter according to the invention, having four inputs 1, 3, 5 and 7 to which signals of four pixels $x_1$, $x_2$, $x_3$ and $x_4$, respectively, are applied. These four pixels $x_1$, $x_2$, $x_3$ and $x_4$ may be located with respect to one another and to a pixel to be interpolated in the way as is shown in FIG. 2 or in FIG. 3, in which a dot (.) denotes the pixel to be interpolated. The inputs 1 and 3 of the interpolation filter are also inputs of a median filter 9, a third input 11 of which is connected to the input 5 of the interpolation filter. An output 13 of the median filter 9 is coupled via a delay element 14 to a first input 15 of a combination circuit 17 constituted by an adder, an output 19 of which also constitutes an output of the interpolation filter. The input 7 of the interpolation filter is also a first input of a correction circuit 21, a second input 23 of which is connected to the input 5 of the interpolation filter. The inputs 7 and 23 of the correction circuit 21 also constitute inputs of an averaging circuit 25. An output 27 of the averaging circuit 25 is connected to a positive input 29 of a subtractor circuit 31 whose negative input 33, which also constitutes a third input of the correction circuit 21, is connected to the output 13 of the median filter 9. If the inputs 29 and 33 of the subtractor circuit 31 are exchanged, the combination circuit 17 must be constituted by a further subtractor circuit, the first input 15 of which is a positive input and the second input 43 is a negative input. An output 35 of the subtractor circuit 31 is connected to an input 37 of a low-pass filter 39 whose output 41, which also constitutes an output of the correction circuit 21, is connected to a second input 43 of the combination circuit 17. The low-pass filter 39 operating in the direction of the connection line of the pixels $x_3$ and $x_4$ ensures that the correction circuit 21 is exclusively active for those frequencies at which the median filter 9 does not function correctly, but at which the averaging circuit does function correctly.

The input 37 of the low-pass filter 39 is connected to an input 45 of a first delay element 47 and via a first multiplier 49 to a first input 51 of a further adder 53. An output 55 of the first delay element 47 is connected via a second multiplier 57 to a second input 59 of the further adder 53, and via a second delay element 61 and a third multiplier 63 to a third input 65 of the further adder 53. An output 67 of the further adder 53 is connected to the output 41 of the low-pass filter 39. The multipliers 49, 57 and 63 preferably multiply by the factors ¼, ½ and ⅝, respectively, so that the multipliers can be realized by a suitable choice of the wiring, based on the recognition that a multiplication by ½ corresponds to shifting bits in a bit word through one position to the right and that a multiplication by ¼ corresponds to shifting bits in a bit word through two positions to the right. The delay of the delay element 14 is to be chosen equal to the delays of the delay element 47 or 61 corrected, if necessary, with the delays caused by the subtractor circuit 31, the multiplier 49, 57 or 63 and the further adder 53. If the pixels have a configuration as is shown in FIG. 3, the delays of the delay elements 47 and 61 must each be equal to two line periods of the picture signal applied to the interpolation filter. If the pixels have a configuration as is shown in FIG. 2, these delays need only be equal to one sampling period of the picture signal applied to the interpolation filter, so that the configuration according to the FIG. 2 is preferred.

If the picture signal applied to the interpolation filter originates from a field composed of four received fields, the output signal of the interpolation filter can be applied substantially directly to a display device. If the picture signal applied to the interpolation filter originates from only one received field, an extra interpolation step is to be carried out. A very simple interpolater is preferably chosen for this purpose, for example an interpolator determining the mean value of two pixels located side by side on the same line. Such a simple interpolator may be used because the spatial resolution is low anyway in moving pictures. When using the interpolation filter in a system in which two successive fields to be transmitted are obtained in the transmitting section from one high-definition field having the double line number, the required extra interpolation step may be carried out by simply averaging two successive lines.

On reading the subject description, those skilled in the art will be able to conceive numerous modifications. All these modifications are considered to be within the scope of the invention.

What is claimed is:

1. An interpolation filter for a picture signal sampled in accordance with a sampling pattern which is shifted from line to line, characterized in that the interpolation filter is provided with a median filter having three inputs for receiving signals of three picture elements (pixels) located around a pixel to be interpolated, a correction circuit comprising an averaging circuit having two inputs for receiving signals of two pixels located diametrically with respect to the pixel to be interpolated, one of the two inputs being coupled to one out of said three inputs of the median filter, said averaging circuit having an output which is coupled to an output of the correction circuit, and a combination circuit having a first and a second input which are coupled to an output of the median filter and to the output of the correction circuit, respectively.

2. An interpolation filter as claimed in claim 1, wherein that the correction circuit is further provided with a subtractor circuit having a first input which is coupled to the output of the averaging circuit and a second input which is coupled to the output of the median filter, and a low-pass filter operating in a direction of a connection line of the pixels located diametrically with respect to the pixel to be interpolated, said low-pass filter having an input which is coupled to an output of the subtractor circuit and an output which is coupled to the output of the correction circuit.

3. An interpolation filter as claimed in claim 2, wherein in that the pixels whose signals are applied to the averaging circuit are located on the same line, the low-pass filter being provided with delay elements, a delay time of which is equal to one sampling period of the picture signal.

4. A receiver provided with an interpolation filter for a picture signal sampled in accordance with a sampling pattern which is shifted from line to line, characterized in that the interpolation filter is provided with a median filter having three inputs for receiving signals to three picture elements (pixels) located around a pixel to be interpolated, a correction circuit comprising an averaging circuit having two inputs for receiving signals of two pixels located diametrically with respect to the pixel to be interpolated, one of the two inputs being coupled to one out of said three inputs of the median filter, said averaging circuit having an output which is coupled to an output of the correction circuit, and a combination circuit having a first and a second input which are coupled to an output of the median filter and to the output of the correction circuit, respectively.

* * * * *